United States Patent
Smith

(10) Patent No.: US 10,001,048 B2
(45) Date of Patent: Jun. 19, 2018

(54) CYCLONIC THERMAL DIFFUSER AND METHOD

(71) Applicant: Jeffrey P. Smith, Prosper, TX (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days. days.

(21) Appl. No.: 15/075,480

(22) Filed: Mar. 21, 2016

(65) Prior Publication Data

US 2017/0268403 A1    Sep. 21, 2017

(51) Int. Cl.
| | |
|---|---|
| *F01N 13/08* | (2010.01) |
| *F01N 1/12* | (2006.01) |
| *F01N 1/08* | (2006.01) |
| *F01N 3/05* | (2006.01) |

(52) U.S. Cl.
CPC ............ *F01N 13/082* (2013.01); *F01N 1/087* (2013.01); *F01N 1/12* (2013.01); *F01N 3/05* (2013.01); *F01N 2270/02* (2013.01); *F01N 2270/08* (2013.01); *F01N 2470/08* (2013.01); *F01N 2470/10* (2013.01); *F01N 2490/16* (2013.01)

(58) Field of Classification Search
CPC ... F01N 1/087; F01N 1/12; F01N 3/05; F01N 13/082; F01N 2270/02; F01N 2270/08; F01N 2470/08; F01N 2490/16
USPC ........................................... 60/317, 320, 324
See application file for complete search history.

(56) References Cited

U.S. PATENT DOCUMENTS

| | | | |
|---|---|---|---|
| 3,875,745 A | 4/1975 | Franklin | |
| 4,066,214 A | 1/1978 | Johnson | |
| 4,244,193 A | 1/1981 | Haakenson | |
| 4,567,960 A | 2/1986 | Johnson et al. | |
| 4,848,281 A * | 7/1989 | McCord | F02B 27/00 |
| | | | 123/184.58 |
| 5,261,229 A | 11/1993 | Ford et al. | |
| 5,269,139 A | 12/1993 | Klees | |
| 5,908,159 A | 6/1999 | Rudolph | |
| 6,854,260 B2 | 2/2005 | Anderson | |
| 8,166,752 B2 | 5/2012 | Garcia et al. | |

(Continued)

FOREIGN PATENT DOCUMENTS

| | | | | |
|---|---|---|---|---|
| EP | 1770249 A1 * | 4/2007 | ............... | F01N 1/12 |
| GB | 358970 A * | 10/1931 | ............... | F01N 1/12 |
| RU | 62374 U1 | 4/2007 | | |

OTHER PUBLICATIONS

Elieson, B.D., "Ambient Air Cooling," The Data Center Journal, Jun. 11, 2012, <http://www.datacenterjournal.com/ambient-air-cooling/> [retrieved Jul. 24, 2015], 5 pages.

(Continued)

*Primary Examiner* — Jorge Leon, Jr.

(74) *Attorney, Agent, or Firm* — Christensen O'Conner Johnson Kindness PLLC

(57) ABSTRACT

A diffuser is configured for use on a vehicle having an engine and an exhaust pipe. The diffuser includes a conduit with a first end configured to receive exhaust gases from the engine. A diffusion fitting is coupled to a second end of the conduit to receive exhaust gases discharged from the conduit. The diffusion fitting has an outer wall that includes a curved surface. The curved surface is configured to guide the exhaust gases discharged from the conduit about an axis so that exhaust gases exit a first side of the diffusion fitting rotating about the axis.

10 Claims, 8 Drawing Sheets

(56) References Cited

U.S. PATENT DOCUMENTS

| | | |
|---|---|---|
| 8,365,521 B2 | 2/2013 | Ferderer et al. |
| 8,418,449 B2 * | 4/2013 | Tatur .................. B01F 3/02 |
| | | 123/306 |
| 8,549,850 B2 | 10/2013 | Janakiraman et al. |
| 2005/0150215 A1 | 7/2005 | Taylor, III et al. |
| 2005/0150719 A1 * | 7/2005 | Gorenflo .................. F01N 3/02 |
| | | 181/251 |
| 2008/0127641 A1 * | 6/2008 | Kellermann .......... F01N 13/002 |
| | | 60/324 |
| 2008/0155972 A1 | 7/2008 | Driscoll et al. |
| 2010/0000205 A1 | 1/2010 | Freese, V |
| 2012/0125300 A1 * | 5/2012 | Caldwell .......... F02M 35/10222 |
| | | 123/568.12 |
| 2013/0098008 A1 * | 4/2013 | Mori ...................... F01N 3/103 |
| | | 60/303 |
| 2013/0186077 A1 | 7/2013 | Morimoto et al. |
| 2015/0040545 A1 * | 2/2015 | Janssen ................ F01N 13/082 |
| | | 60/320 |

OTHER PUBLICATIONS

International Search Report and Written Opinion of the International Searching Authority dated Aug. 17, 2017, issued for International Application No. PCT/US2017/023374, filed Mar. 21, 2017, 6 pages.

* cited by examiner

CYCLONIC THERMAL DIFFUSER AND METHOD

BACKGROUND

New, more stringent emission limits for diesel engines necessitate the use of exhaust after-treatment devices. Emissions-related after-treatment strategies for vehicles have resulted in increased exhaust outlet temperatures, particularly during DPF/SCR "regeneration," whereby accumulated particulate is cooked into ash, and undesirable combustion product gases are chemically converted to less undesirable gases through the injection of reactive fluids into their respective catalyst beds.

Exhaust systems without after-treatment devices typically discharge exhaust gas at a temperature of around 650 degrees Kelvin. During the regeneration cycle, the temperature of the exhaust gas plume may rise significantly above acceptable temperatures normally experienced by exhaust systems without such after-treatment devices. As an example, an exhaust system having an after-treatment device that includes a regeneration cycle may experience an exhaust gas plume temperature exceeding 900 degrees Kelvin at its center core. Exhaust gas at this high exit temperature creates a potentially hazardous operating environment. In the case of horizontal exhaust outlets, the hot exhaust comes in close proximity to ground level combustibles, such as grass or paper. For certain exhaust configurations, the high temperature gases can also present a safety hazard for people in proximity to the exhaust outlets.

Prior art and current exhaust pipe diffusers are not designed to optimally intermingle cooling air with a hot stream of exhaust gases, as described above. The result at the exit plane of the exhaust pipe can be a cool ring of exhaust flow surrounding a very hot exhaust core.

Thus, there exists a need for a flow diffuser for an exhaust pipe for diffusing hot exhaust gas on exit from an exhaust pipe

SUMMARY

The present device cools the hot exhaust stream by injecting cool ambient air into the exhaust stream and mixing and dispersing the ambient air and exhaust gases by imparting a cyclonic motion on the exhaust gases being discharged from the diffuser to drive the combined gases into a vortex/cyclonic form.

A first representative embodiment of a disclosed diffuser is configured for use on a vehicle having an engine and an exhaust pipe. The diffuser includes a conduit with a first end configured to receive exhaust gases from the engine. A diffusion fitting is coupled to a second end of the conduit to receive exhaust gases discharged from the conduit. The diffusion fitting has an outer wall that includes a curved surface. The curved surface is configured to guide the exhaust gases discharged from the conduit about an axis so that exhaust gases exit a first side of the diffusion fitting rotating about the axis.

A second representative embodiment of a disclosed diffuser is configured for use on a vehicle having an engine and an exhaust pipe. The diffuser has a conduit, a first end of which is configured to receive exhaust gases from the engine. A second end of the conduit is coupled to a diffusion fitting so that the diffusion fitting receives exhaust gases discharged from the conduit. The diffusion fitting includes a channel configured to direct the exhaust gases along an arcuate path about an axis. The channel also defines a passageway extending through the diffusion fitting. The passageway is configured to entrain ambient air through the passageway.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
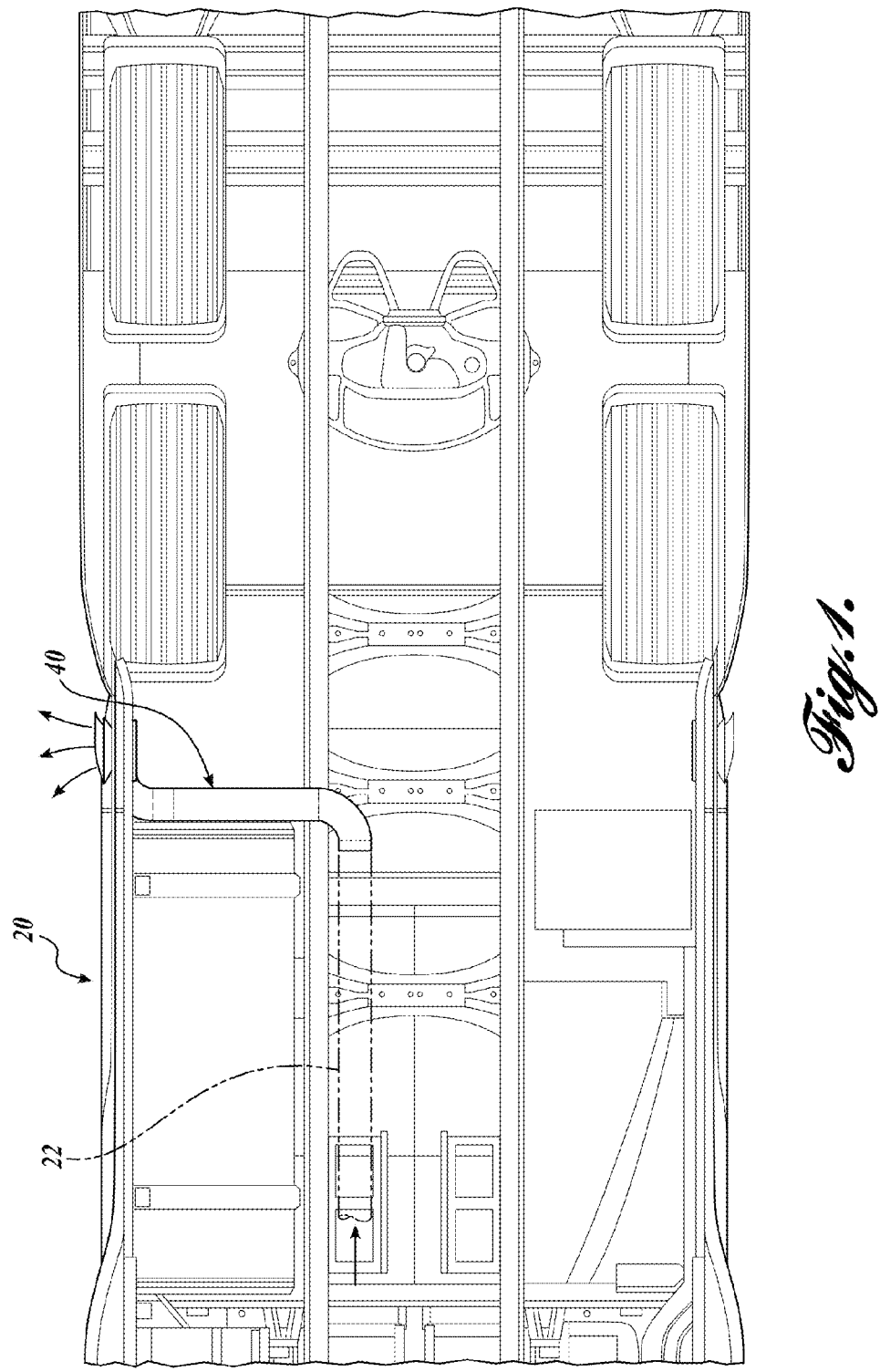
FIG. 1 is a bottom view of a cyclonic thermal diffuser formed in accordance with a first representative embodiment of the present disclosure, showing the thermal diffuser coupled to a vehicle of the type having an engine and an exhaust pipe.
Figure 2:
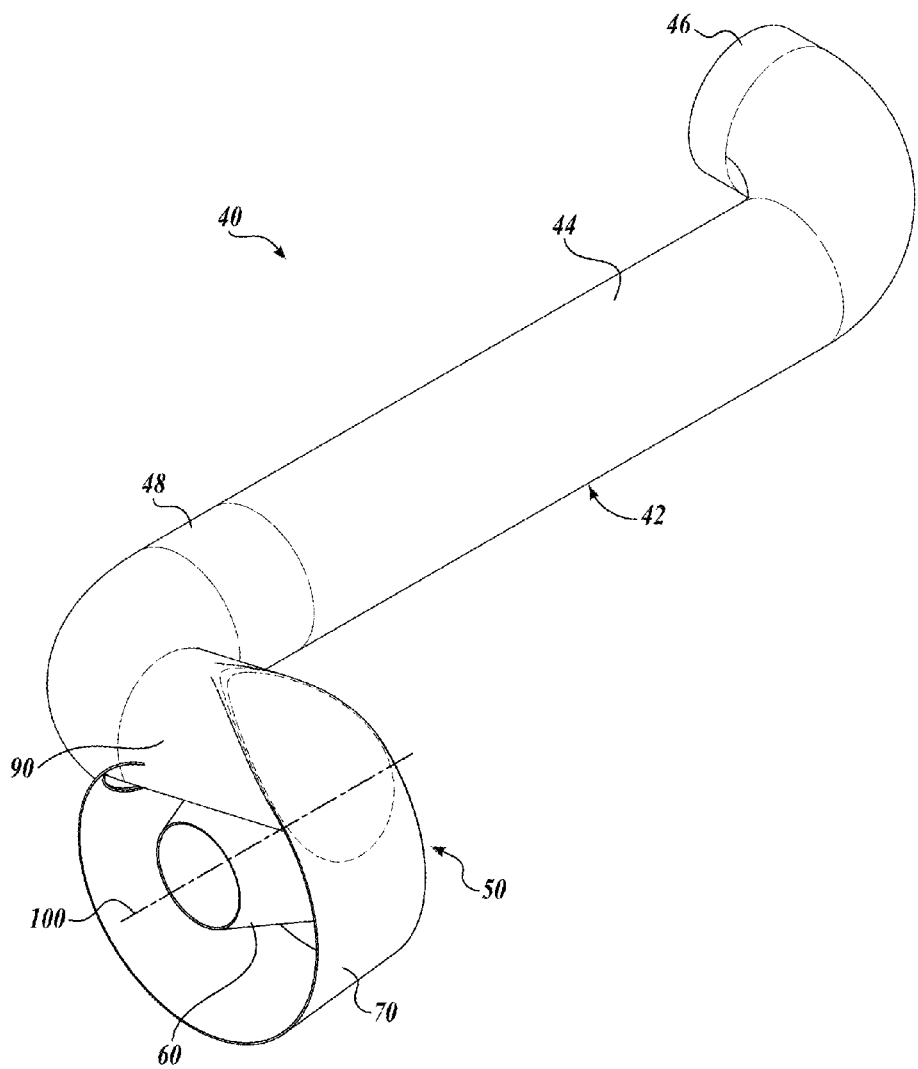
FIG. 2 shows an isometric view of the diffuser of FIG. 1.
Figure 3:
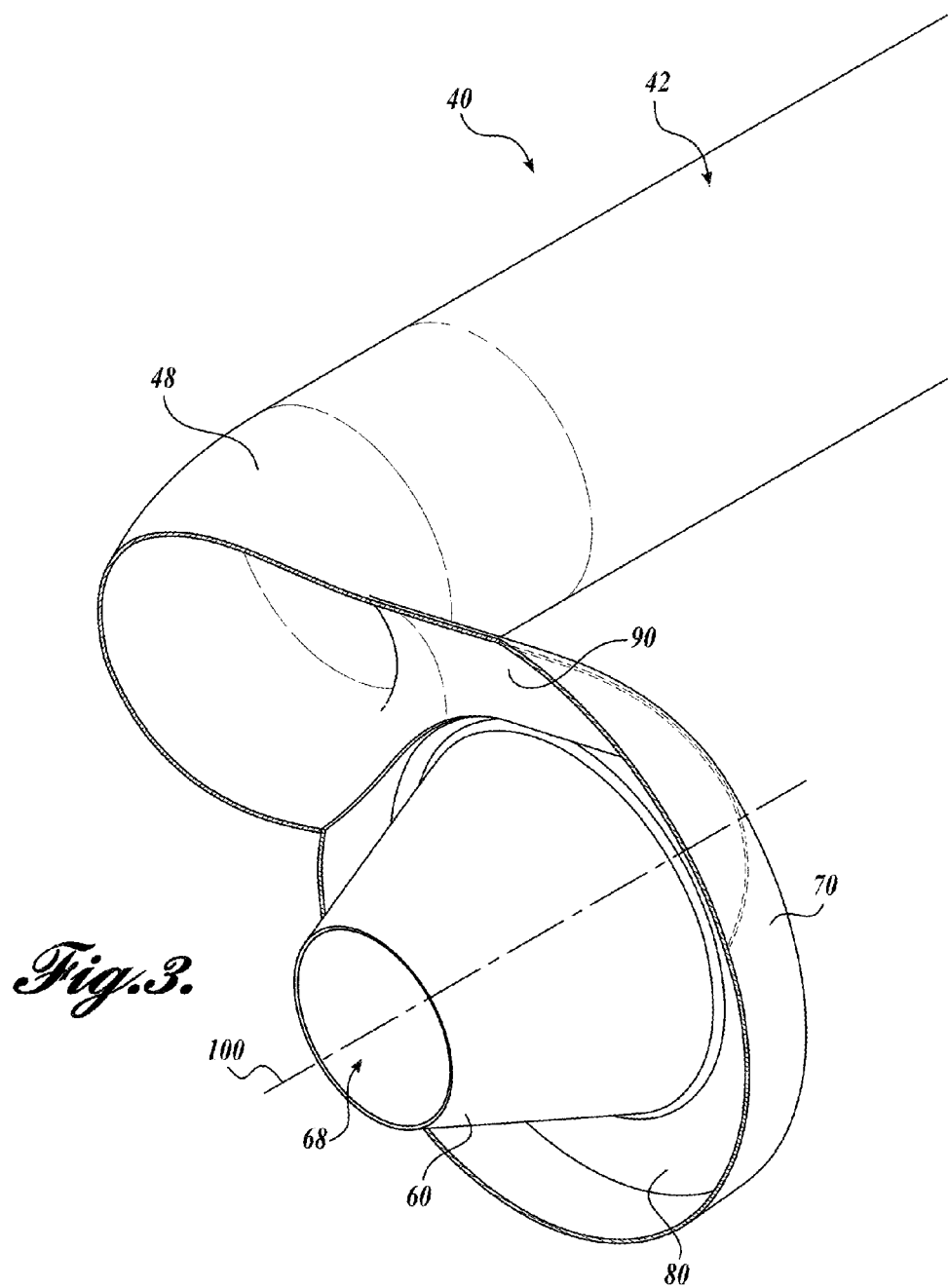
FIG. 3 shows a partially cutaway isometric view of the diffuser of FIG. 1.

Flow diffusers of the present disclosure reduce temperature and velocity profiles of hot exhaust gas plumes after exiting an exhaust pipe to reduce the risk of danger associated with hot exhaust pipe discharge. As discussed in greater detail below, the representative flow diffusers described herein reduce exhaust gas velocity and generate a cyclonic flow path, thereby promoting ready mixing and diffusion of hot exhaust gas with cooler surrounding ambient air. While fluid mixing with cooler ambient air contributes more significantly to the overall heat dissipation capabilities of the various flow diffuser, some of the embodiments described herein are also configured to promote heat dissipation (for example, heat loss through the outer surface of the flow diffuser prior to the exhaust gas exiting the flow diffuser), as described in greater detail below.

A cyclonic flow diffuser 40 constructed in accordance with a first representative embodiment of the present disclosure may be best understood by referring to FIGS. 1-5. The flow diffuser 40 includes a substantially tubular body 42 and a diffusion fitting 50. The body 42 has an outer surface 44 and a first end 46 configured for attachment to the exhaust pipe 22 of a vehicle 20. A second end 48 of the body 42 is coupled to diffusion fitting 50 and is configured so that the diffusion fitting 50 is located proximate to a side of the vehicle 20. During the operation of a vehicle, for example, the vehicle 20 shown in the illustrated embodiment of FIG. 1, the body 42 acts as a conduit to direct exhaust gases from the exhaust pipe 22 to the diffusion fitting 50. As the exhaust gas travels through the body 42 on the way to the diffusion fitting 50, some of the exhaust gas heat is diffused to the surrounding ambient air through the walls of the body.

Although illustrated and described in conjunction with under-chassis exhaust pipes, other configurations, such as vertical (i.e., stack) exhaust pipes and rear discharge exhaust pipes, are also intended to be within the scope of the present disclosure. It should be appreciated that the first end 46 of the body 42 is an inlet, connectable to the exhaust pipe 22 (see FIG. 1) by any means known to those having ordinary skill in the art, including by an interference fit, welding, or any suitable fastening devices, such as bolts, rivets, or other fasteners. Further, it will be appreciated that the disclosed configuration is exemplary only and should not be considered limiting. In this regard, various embodiments of the configuration of the body 42 may include different sizes, shapes, cross-sectional areas, etc., and such embodiments should be considered within the scope of the present disclosure.

The diffusion fitting 50 includes an inner wall 60 extending along a central axis 100. In the illustrated embodiment, the inner wall 60 has a generally frustoconical shape, with a first end 62 and a second end 64. The first end 62 has a first radius and defines a first aperture 66. The second end 64 of the inner wall 60 has a second radius and defines a second aperture 68. The inner wall 60 tapers between the first end 62 and the second end 64 so that the first radius is larger than the second radius, and therefore, the first aperture 66 is larger than the second aperture 68.

It will be appreciated that although illustrated as having a frustoconical shape, other configurations are possible within the scope of the present disclosure. In this regard, alternate embodiments with different inner wall angles and cross-sections that define varying paths around axis 100 are contemplated.

Figure 5:
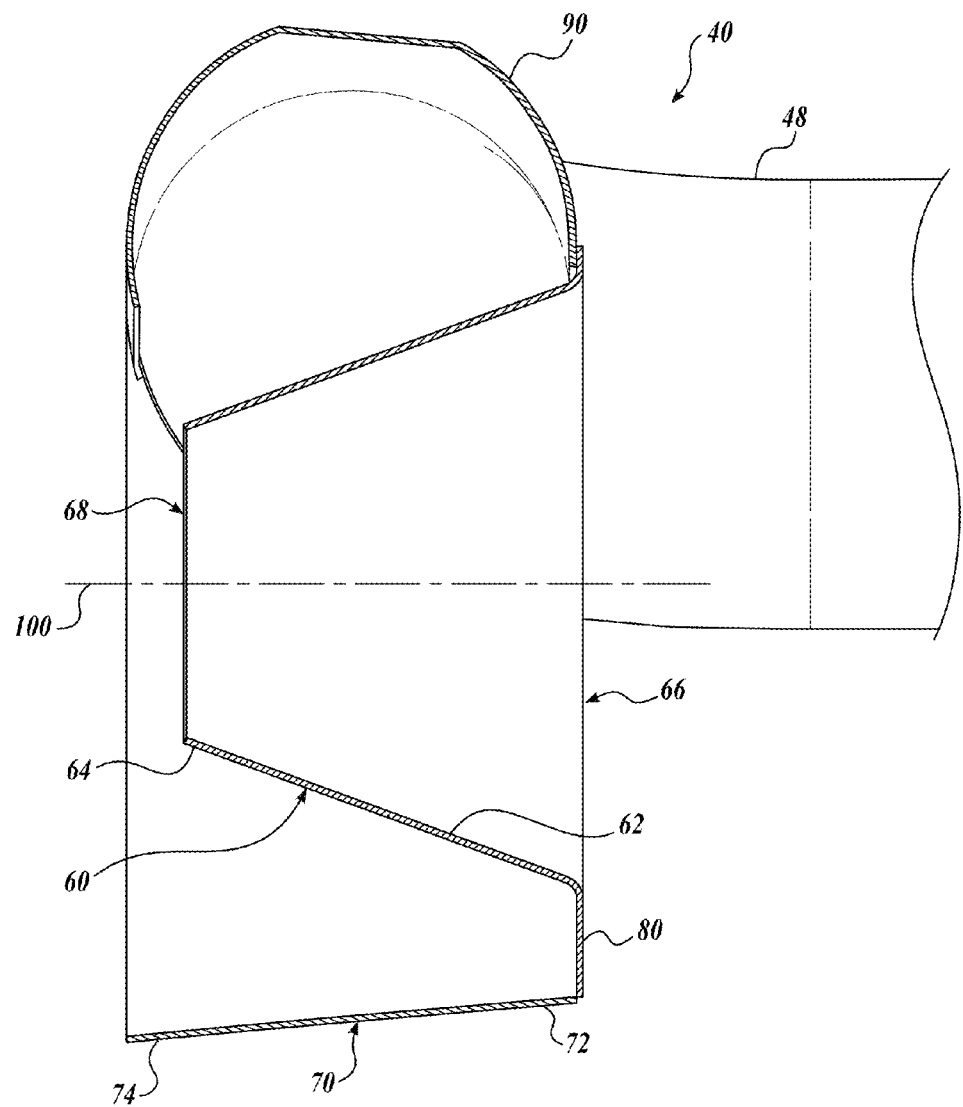
FIG. 5 shows a cross-sectional view of the diffuser of FIG. 4.

An outer wall 70 extends round the inner wall 60 and, therefore, axis 100 so that the inner wall 60 is surrounded by the outer wall 70. The outer wall 70 has a first end 72 and a second end 74. A flat base 80 spans the space between the first end 72 of the outer wall 70 and the first end 62 of the inner wall 60. As best shown in FIG. 5, the inner wall 60, the base 80, and the outer wall 70 cooperate to define a three-sided open channel. That is, the inner wall 60, the base 80, and the outer wall 70 act as three sides of a channel that follows an arcuate path that extends at least partially around axis 100.

In the illustrated embodiment, the outer wall 70 tapers outwardly from the first end 72 to the second end 74. As a result, the channel defined by the inner and outer walls 60 and 70 and the base 80 have the shape of a truncated "V." It will be appreciated, however, that the disclosed configuration is exemplary only, and other configurations with different cross-sectional characteristics can be implemented within the scope of the present disclosure.

Figure 4:
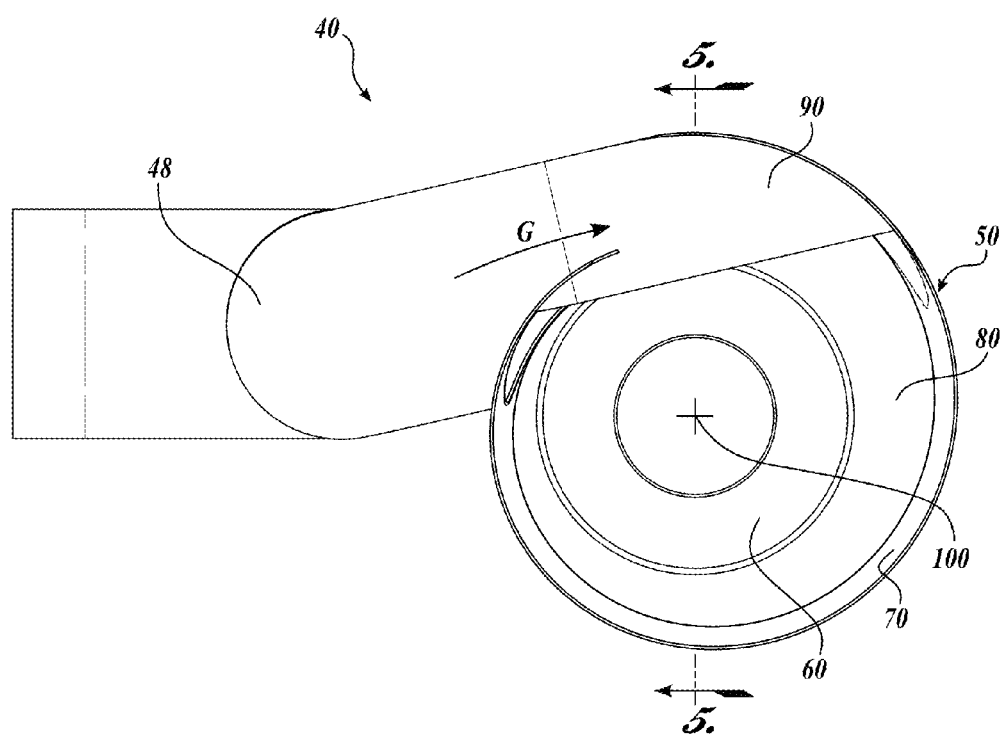
FIG. 4 shows a side view of the diffuser of FIG. 1.

The outer wall 70 includes and opening sized and configured to engage the second end 48 of the diffuser body 42 to receive the exhaust gases from the engine. As best shown in FIG. 4, the second end 48 of the diffuser body 42 engages the diffusion fitting 50 such that exhaust gases G are discharged into the channel of the diffusion fitting in a direction that is approximately normal to the central axis 100. More specifically, the exhaust gases G are discharged into the channel such that the gases G will travel through the channel in a clockwise direction as viewed in FIG. 4. A transition surface 90 extends from the diffuser body 42 to the outer wall 70 to guide the exhaust gases from an axial flow along the diffuser body into the diffusion fitting 50.

Exhaust gases G enter the diffusion fitting 50 traveling along a path that is generally tangent to the outer wall 70 of the diffusion fitting 50. Having entered the diffusion fitting 50, the exhaust gases G travel circumferentially about axis 100 along the channel defined by the inner wall 60, the outer wall 70, and the base 80. As additional exhaust gases G enter the diffusion fitting 50, the exhaust gases traveling through the channel are forced in an axial direction parallel to axis 100. The circumferential movement of the exhaust gases G combined with the axial movement results in a cyclonic flow path as the exhaust gases leave the diffusion fitting 50.

The flow of exhaust gases from the diffusion fitting 50 creates a low pressure area at the second aperture 68. The low pressure entrains ambient air into the first aperture 68 to be discharged from the second aperture 68 along axis 100. The entrained ambient air, which has a significantly lower temperature than the exhaust gases G, is mixed with the exhaust gases and results in an exhaust gas G/air mixture that is significantly cooler than the exhaust gases prior to the mixing. The mixing is aided by the cyclonic movement of the exhaust gases G exiting the diffusion fitting 50. The result is a more thorough and immediate mixing with the entrained air, which in turn improves the cooling effect of the entrained air. The cyclonic movement also increases the amount of ambient air mixed with the exhaust gases after the exhaust gases have been discharged from the diffusion fitting 50. Because of the better mixing provided by the cyclonic motion imparted by the diffusion fitting 50, the cooling of the exhaust gases G is improved and occurs over a shorter distance from the exit plane of the diffusion fitting 50.

Figure 6:
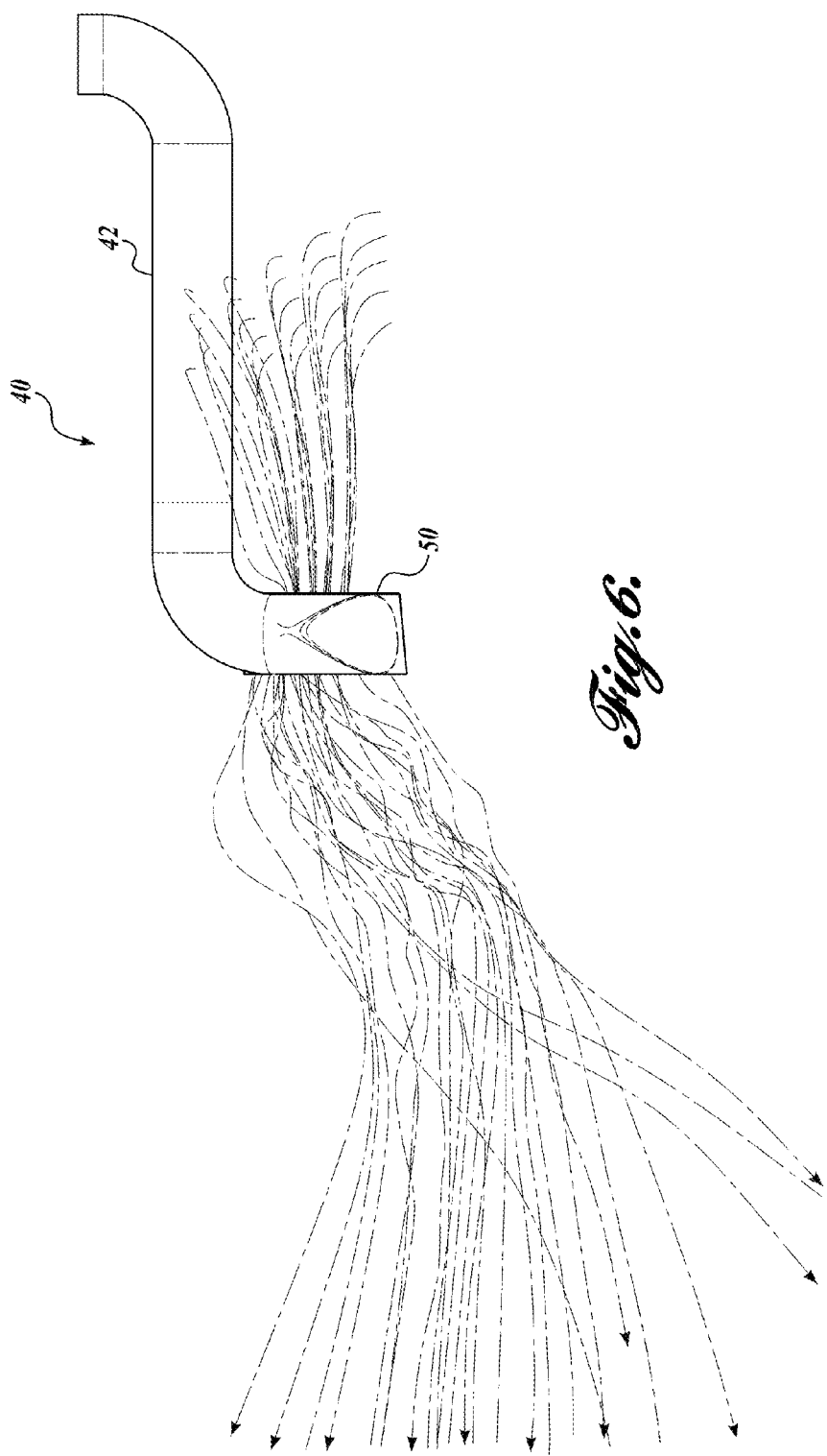
FIG. 6 shows a simulated exhaust flow through the diffuser of FIG. 1.

FIG. 6 shows a simulated flow of exhaust gases and entrained ambient air through a representative embodiment of the described diffuser 40. The cyclonic motion imparted by the diffusion fitting 50 is greatest at the exit plane of the diffusion fitting. The cyclonic motion mixes the high temperature exhaust gases G with the relatively low temperature ambient air, which is both located at the discharge location of the diffusion fitting 50 and also entrained through the diffusion fitting from the opposite side of the diffusion fitting.

Figure 7:
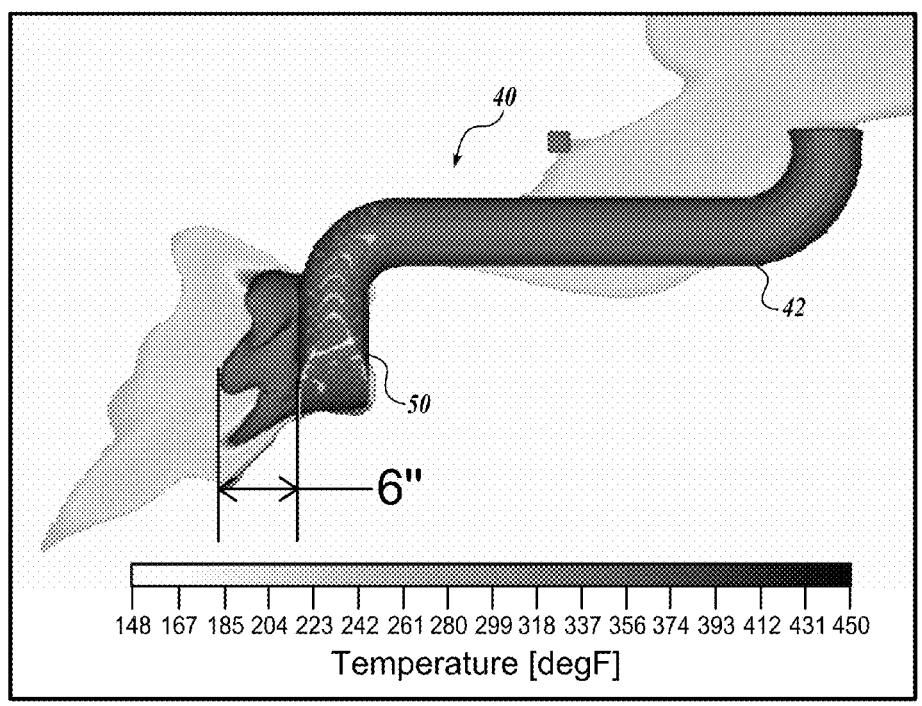
FIG. 7 shows an isotherm of a simulated exhaust flow through the diffuser of FIG. 1.

The heat transfer and fluid mixing promoted by the representative embodiments of the diffuser 50 described herein may be further understood by referring to FIG. 7, which shows an isotherm of a simulated flow of exhaust gas being discharged from the flow diffuser 40 of FIG. 1.

Referring to the representative data in FIG. 7, the hot core of the exhaust gas streams exiting the flow diffuser 20 has immediate heat dissipation from over 450 degrees Fahrenheit to less than approximately 300 degrees Fahrenheit within a distance of less than approximately 6 inches from the exit plane of the diffusion fitting 50. Simulations of the hot core of the exhaust gas stream exiting the standard exhaust pipe (without a flow diffuser), on the other hand, have little to no heat dissipation from over 450 degrees Fahrenheit to less than approximately 300 degrees Fahrenheit until the exhaust gas reaches an axial distance of over 36 inches from the exit plane of the exhaust pipe.

There is significantly less mixing between the exhaust gases and the surrounding ambient air at the barrier of the hot core of the exhaust gas stream from a standard exhaust pipe, as compared to the mixing achieved with the diffuser 40 of FIG. 1, described above. Less mixing at the standard exhaust pipe outlet is a result of the substantially linear direction of the exhaust gas flow at the exhaust pipe outlet for a standard exhaust pipe. Even with some degree of turbulent exhaust gas flow, the mixing of discharged exhaust gases with ambient is significantly less than that achieved with the disclosed diffuser 40. Therefore, the hot spot remains a penetrating jet of hot exhaust gas, even after traveling a significant distance from the exit plane.

Accordingly, the mixing and heat dissipation effects of the flow diffusers formed in accordance with embodiments of the present disclosure are significantly improved over the mixing and heat dissipation effects of a standard exhaust pipe and known diffusers.

Figure 8:
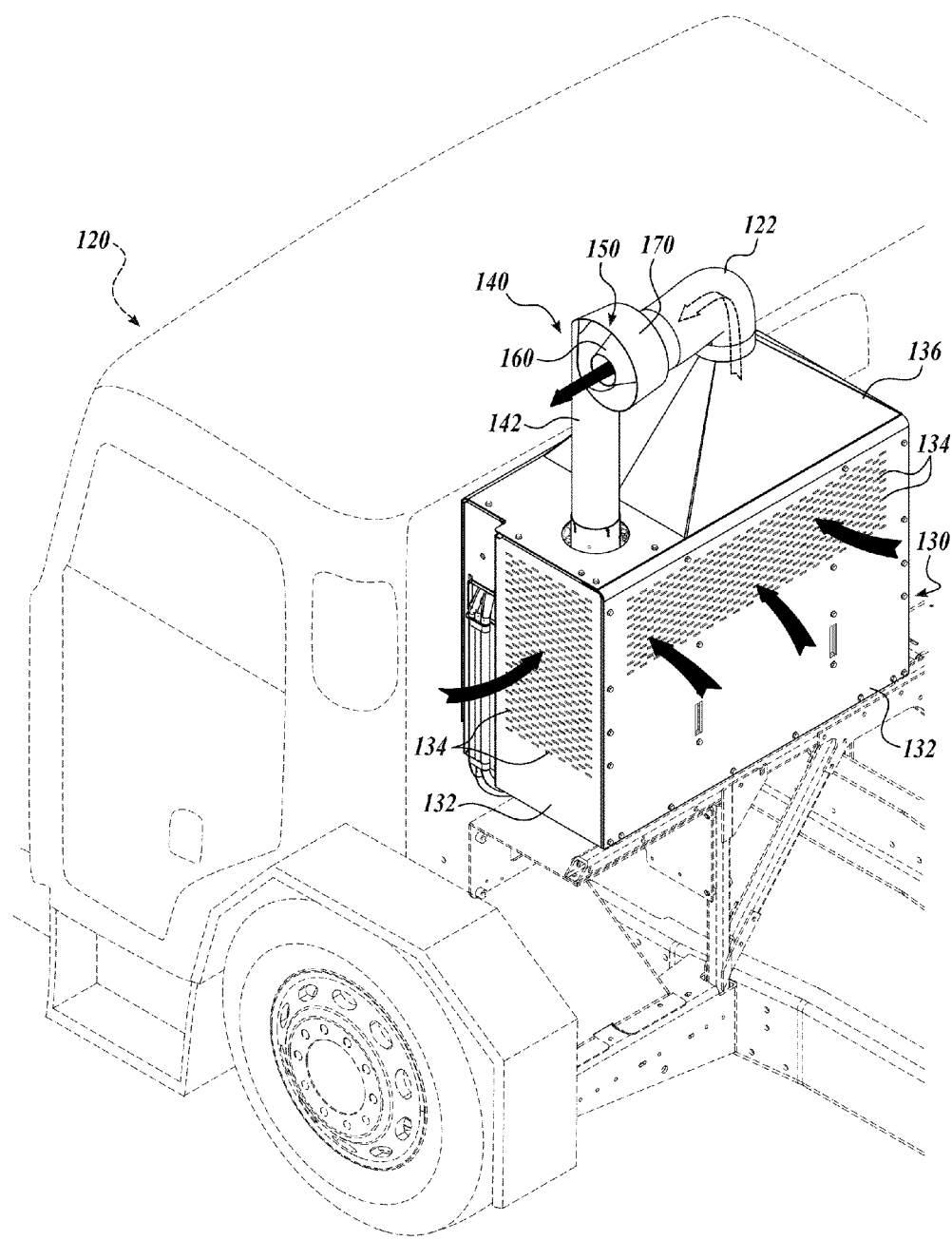
FIG. 8 shows an isometric view of a cyclonic thermal diffuser formed in accordance with a second representative embodiment of the present disclosure, showing the thermal diffuser coupled to a vehicle of the type having an engine and an exhaust pipe.

FIG. 8 shows a thermal diffuser 140 according to a second representative embodiment of the present disclosure. As previously noted, exhaust after-treatment systems operate at high temperatures. During operation, various components of these systems also become hot. In order to prevent flammable material from contacting hot system components, the systems, or portions thereof, are often disposed with a guard housing.

The vehicle 120 shown in FIG. 8 includes an exhaust after-treatment system (not shown) surrounded by a guard housing 130. In the illustrated embodiment, the after-treatment system is a selective catalytic reduction (SCR) system positioned behind the cab of the vehicle 120, however, it will be appreciated that the type and position of the after-treatment system may vary within the scope of the present disclosure.

The illustrated guard housing 130 is a generally box-shaped housing sized and configured to surround the SCR system. The sides of the housing 130 are flat panels 132 with vents 134 formed therein to allow air to flow through the panels 132. The illustrated housing is exemplary and should not be considered limiting. In this regard, any suitable housing configuration that allows ambient air to flow into the interior of the housing (as described below) can be utilized, and such configurations should be considered within the scope of the present disclosure.

Exhaust gases exiting the after-treatment system pass through a diffuser 140. Except as noted, the illustrated diffuser 140 is similar to the diffuser 40 shown in FIGS. 1-7, wherein reference numbers XX from FIGS. 1-7 correspond to reference numbers 1XX in FIG. 8. The diffuser 140 includes a body 142 operable connected at one end to the after-treatment system to receive treated exhaust gases and discharge them through a diffusion fitting 150 coupled to a second end of the body 142. Exhaust gases received by the diffusion fitting 150 are directed by the inner wall 160 and outer wall 170 to exit the diffusion fitting into a cyclonic path.

A conduit 122 is coupled at one end to the second aperture of the diffusion fitting 150. A second end of the conduit is coupled to the housing 130 by a plenum 136. The conduit 122 and the plenum 136 are configured so that an interior portion of the housing 130 is in fluid communication with the first and second apertures of the diffusion fitting 150.

When exhaust gases are discharged through the diffusion fitting 150, the low pressure created at the second aperture entrains air through the diffusion fitting. More specifically, the low pressure draws air from the interior of the housing 130 through the conduit 122. As air from within the housing 130 is drawn through the diffusion fitting 150, ambient air is drawn into the housing through the vents 134 in the walls of the housing. As a result, ambient air flows through the housing 130 to cool components of the exhaust after-treatment system, and then is discharged from the diffusion fitting 150 to mix with the exhaust gases received from the after-treatment system and discharged in a cyclonic path.

Thus, rather than simply entraining ambient air to cool the exhaust gases, the embodiment of FIG. 8 also uses the diffusion fitting 150 to generate an airflow through the housing 130 that cools the after-treatment system.

While illustrative embodiments have been illustrated and described, it will be appreciated that various changes can be made therein without departing from the spirit and scope of the disclosure.

The invention claimed is:

1. A diffuser for a vehicle having an engine and an exhaust pipe, comprising:
   (a) a conduit, a first end of the conduit being configured to receive exhaust gases from the engine; and
   (b) a diffusion fitting coupled to the conduit and in fluid communication with a second end of the conduit to receive exhaust gases discharged from the conduit, the diffusion fitting comprising:
      (i) an outer wall, the outer wall comprising a curved surface; and
      (ii) a frustoconical inner wall at least partially disposed within the outer wall and defining a central passage, the central passage having an inlet and an outlet, the outlet being smaller than the inlet,
   wherein the diffusion fitting is configured so that exhaust gases are discharged from the conduit between the inner and outer walls, the inner and outer walls guiding the exhaust gases about an axis so that the exhaust gases exit a first side of the diffusion fitting rotating about the axis, the exhaust gases entraining ambient air through the central passage from the inlet through the outlet.

2. The diffuser of claim 1, the diffusion fitting further comprising a base extending from the outer wall to the inner wall at a second side of the diffusion fitting, the base preventing exhaust gases from exiting the second side of the diffusion fitting.

3. The diffuser of claim 2, wherein the inner wall, the outer wall, and the base cooperate to define a three-sided channel.

4. The diffuser of claim 3, wherein the three-sided channel extends around the axis.

5. The diffuser of claim 1, wherein the diffusion fitting is in fluid connection with an area surrounding a vehicle component, wherein the diffusion fitting is configured to generate a flow of ambient air past the component.

6. A diffuser for a vehicle having an engine and an exhaust pipe, comprising:
   (a) a conduit, a first end of the conduit being configured to receive exhaust gases from the engine; and
   (b) a diffusion fitting coupled to the conduit and in fluid communication with a second end of the conduit to receive exhaust gases discharged from the conduit, the diffusion fitting comprising a channel configured to direct the exhaust gases along an arcuate path about an axis, the channel defining a passageway extending through the diffusion fitting, the passageway having an inlet and an outlet, the outlet being smaller than the inlet, wherein the passageway is configured to entrain ambient air through the passageway, wherein the exhaust gases are discharged from the conduit into the diffusion fitting in a direction normal to the axis.

7. The diffuser of claim 6, wherein a portion of the channel is at least partially defined by a frustoconical surface.

8. The diffuser of claim 7, wherein the passageway extends through the frustoconical surface.

9. The diffuser of claim 7, wherein the channel is a three-sided channel comprising an inner wall connected to an outer wall by a base, the inner wall being defined by the frustoconical surface.

10. The diffuser of claim 9, wherein the three-sided channel has a cross-section in a form of a truncated "V."

* * * * *